(12) United States Patent
Xu et al.

(10) Patent No.: US 12,119,012 B2
(45) Date of Patent: Oct. 15, 2024

(54) METHOD AND APPARATUS FOR VOICE RECOGNITION IN MIXED AUDIO BASED ON PITCH FEATURES USING NETWORK MODELS, AND STORAGE MEDIUM

(71) Applicant: Beijing Xiaomi Pinecone Electronics Co., Ltd., Beijing (CN)

(72) Inventors: Na Xu, Beijing (CN); Yongtao Jia, Beijing (CN); Linzhang Wang, Beijing (CN)

(73) Assignee: Beijing Xiaomi Pinecone Electronics Co., Ltd., Beijing (CN)

(*) Notice: Subject to any disclaimer, the term of this patent is extended or adjusted under 35 U.S.C. 154(b) by 152 days.

(21) Appl. No.: 17/353,636

(22) Filed: Jun. 21, 2021

(65) Prior Publication Data
US 2022/0270627 A1    Aug. 25, 2022

(30) Foreign Application Priority Data
Feb. 25, 2021    (CN) .......................... 202110213996.4

(51) Int. Cl.
*G10L 21/007*    (2013.01)
*G10L 21/0272*   (2013.01)
*G10L 25/30*     (2013.01)
*G10L 25/51*     (2013.01)

(52) U.S. Cl.
CPC ........ *G10L 21/007* (2013.01); *G10L 21/0272* (2013.01); *G10L 25/30* (2013.01); *G10L 25/51* (2013.01)

(58) Field of Classification Search
CPC ............... G10L 21/007; G10L 21/0272; G10L 25/30; G10L 25/51; G10L 17/02; G10L 17/18; G10L 25/90; G10L 21/028; G10L 15/22; G10L 25/18; G10L 2021/02087
See application file for complete search history.

(56) References Cited

U.S. PATENT DOCUMENTS 5,583,961 A * 12/1996 Pawlewski ............. G10L 25/87
                                                            704/E11.005
6,879,952 B2 *  4/2005 Acero .................... G10L 25/78
                                                            704/223
(Continued)

FOREIGN PATENT DOCUMENTS

CN    105719659 A     6/2016
CN    112242149 A     1/2021
(Continued)

OTHER PUBLICATIONS

Jiang et al, ("A Pitch-aware Speaker Extraction Serial Network", APSIPA Conference, pp. 616-620), Dec. 7-10, 2020 (Year: 2020).*
(Continued)

*Primary Examiner* — Michael N Opsasnick
(74) *Attorney, Agent, or Firm* — Cozen O'Connor

(57) ABSTRACT

The present disclosure relates to a method and an apparatus for audio processing and a storage medium. The method includes: obtaining an audio mixing feature of a target object, in which the audio mixing feature at least includes: a voiceprint feature and a pitch feature of the target object; and determining a target audio matching with the target object in the mixed audio according to the audio mixing feature.

9 Claims, 3 Drawing Sheets

(56) References Cited

U.S. PATENT DOCUMENTS

| | | | | |
|---|---|---|---|---|
| 7,243,060 | B2* | 7/2007 | Atlas | G10L 21/028 704/200 |
| 2003/0033152 | A1* | 2/2003 | Cameron | G10L 15/07 704/E15.045 |
| 2006/0229875 | A1* | 10/2006 | Acero | G10L 15/07 704/E15.011 |
| 2010/0142327 | A1* | 6/2010 | Kepesi | G01S 3/786 367/124 |
| 2011/0125493 | A1* | 5/2011 | Hirose | G10L 21/04 704/207 |
| 2013/0297296 | A1* | 11/2013 | Yoo | G10L 21/0272 704/203 |
| 2019/0124454 | A1* | 4/2019 | Aschbacher | G10L 15/20 |
| 2019/0318757 | A1* | 10/2019 | Chen | G10L 19/022 |
| 2021/0209362 | A1* | 7/2021 | Wexler | G06V 40/20 |
| 2021/0225391 | A1* | 7/2021 | Wexler | H04R 1/342 |
| 2021/0312902 | A1* | 10/2021 | Zhang | G10L 15/20 |

FOREIGN PATENT DOCUMENTS

| | | | |
|---|---|---|---|
| JP | WO2011004579 A1 | 12/2012 | |
| JP | 2021500616 A | 1/2021 | |
| WO | WO 2010035438 A1 | 4/2010 | |

OTHER PUBLICATIONS

Jiang, Y. et al. "A Pitch-aware Speaker Extraction Serial Network" 2020 Asia-Pacific Signal and Information Processing Association Annual Summit and Conference, Dec. 7, 2020, pp. 616-620.
Damirchi, H. et al. "Speaker Extraction Using Stacked BLSTM Optimized with Frequency-domain Differentiated Spectrum Loss" 2020 28th Iranian Conference on Electrical Engineering, IEEE, Aug. 4, 2020, pp. 1-5.
European Patent Application No. 21180752.4 extended Search and Opinion dated Dec. 2, 2021, 9 pages.
Japanese Patent Application No. 2021-100821, Office Action dated Jul. 19, 2022, 4 pages.
Japanese Patent Application No. 2021-100821, English translation of Office Action dated Jul. 19, 2022, 4 pages.
Chinese Patent Application No. 202110213996.4, Office Action dated Sep. 21, 2022, 5 pages.
Chinese Patent Application No. 202110213996.4, English translation of Office Action dated Sep. 21, 2022, 10 pages.
Korean Patent Application No. 10-2021-0075273 Office Action dated Apr. 12, 2022, 7 pages.
Korean Patent Application No. 10-2021-0075273 English translation of Office Action dated Apr. 12, 2022, 10 pages.
Li, T. et al. "Atss-Net: Target Speaker Separation via Attention-based Neural Network" arXiv:2005.09200v1 [eess.AS] May 19, 2020, 5 pages.

* cited by examiner

METHOD AND APPARATUS FOR VOICE RECOGNITION IN MIXED AUDIO BASED ON PITCH FEATURES USING NETWORK MODELS, AND STORAGE MEDIUM

CROSS-REFERENCE TO RELATED APPLICATION

The present application is based upon and claims priority to Chinese Patent Application No. 202110213996.4, filed on Feb. 25, 2021, the entire contents of which are incorporated herein by reference.

TECHNICAL FIELD

The present disclosure relates to an audio processing technology, and particularly to a method and an apparatus for audio processing, and a storage medium.

BACKGROUND

With the development of intelligent electronic devices, human-computer interaction based on voice recognition is widely used in various intelligent terminals. In voice recognition, the target user can be identified based on the voiceprint recognition method, and then corresponding actions can be executed according to the target user's voice instructions; during a voice call, a similar method can also be used for processing: based on the target user's voice, other human voices around are processed for noise reduction, thereby improving the quality of the communication.

SUMMARY

In order to overcome the problem in the related art to a certain extent, the present disclosure provides a method and an apparatus for audio processing, and a storage medium.

According to embodiments of the present disclosure, there is provided a method for audio processing. The method includes: determining an audio mixing feature of a target object, in which the audio mixing feature at least includes: a voiceprint feature and a pitch feature of the target object; and performing voice separation on a mixed audio according to the audio mixing feature to obtain a target audio matching with the target object in the mixed audio.

According to embodiments of the present disclosure, there is provided an apparatus for audio processing, comprising: one or more processors; a memory storing instructions executable by the one or more processors; in which the one or more processors are configured to: determine an audio mixing feature of a target object, in which the audio mixing feature at least includes: a voiceprint feature and a pitch feature of the target object; perform voice separation on a mixed audio according to the audio mixing feature to obtain a target audio matching with the target object in the mixed audio.

According to embodiments of the present disclosure, there is provided a non-transitory computer-readable storage medium having computer-executable instructions stored thereon. When the computer-executable instructions are executed by a processor, the processor is caused to implement a method for audio processing. The method includes: determining an audio mixing feature of a target object, in which the audio mixing feature at least includes: a voiceprint feature and a pitch feature of the target object; and performing voice separation on a mixed audio according to the audio mixing feature to obtain a target audio matching with the target object in the mixed audio.

It is understandable that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

In the prior art, the accuracy of voice recognition is limited, and it is more difficult to distinguish among voices of individuals with of the same gender.

The technical solution provided by the embodiments of the present disclosure may include the following beneficial effects. The target user is identified through the audio mixing feature including the voiceprint feature and the pitch feature, which effectively takes the use of the characteristics of different pitches of different people, thereby improving the voice recognition effect for target users on the basis of the voiceprint feature and the pitch feature, improving the noise reduction effect of voice recognition in voice calls and improving the reliability of recognition in user recognition.

Figure 1:
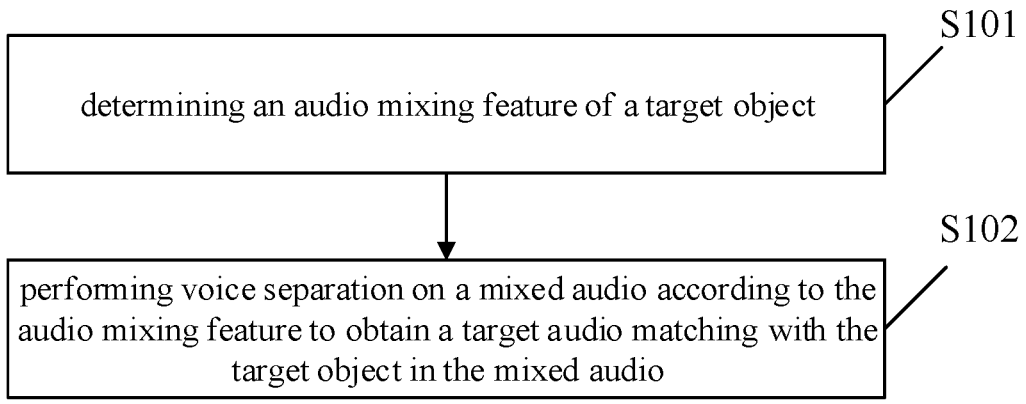
FIG. 1 is a flow chart 1 illustrating a method for audio processing according to an exemplary embodiment.

FIG. 1 is a flow chart illustrating a method for audio processing according to an exemplary embodiment. As illustrated in FIG. 1, the method includes following:

In block S101, an audio mixing feature of a target object is determined, in which the audio mixing feature at least includes: a voiceprint feature and a pitch feature of the target object.

In block S102, voice separation is performed on a mixed audio according to the audio mixing feature to obtain a target audio matching with the target object in the mixed audio.

Here, the above method may be executed by any electronic device with audio collection function, including intelligent terminals, household appliances, and the like, such as smartphones, tablet computers, smart speakers, talk back equipment, and various wearable electronic devices. For easy presentation, the present disclosure takes a terminal as an example as the execution subject of the method.

In the embodiments of the present disclosure, the target object may be a registered user or other objects designated by the user. The audio mixing feature of the target object can be obtained by sampling the target object. For example, the user reads the specified text content according to the instructions to realize the input of the voice, and the terminal performs voice sampling according to the input content by the user, and obtains the audio mixing feature according to the sampled content.

The audio mixing feature can be obtained in advance. For example, the user is instructed to input one or more samples of audio during the terminal registration process so as to obtain the audio mixing feature. The terminal can store the audio mixing feature of the user. Of course, the user here is not limited to the user of the terminal, and it can also be any authorized user. In scenarios where voice recognition is needed, the terminal can invoke the audio mixing feature as a validated parameter, and verify based on the audio mixing feature.

In addition, the audio mixing feature can also be obtained during a voice call, a voice input, and the like. For example, a user makes a voice call through a terminal. In the communication scenario, the user is the closest to the terminal and therefore hears the largest volume. At this time, the terminal can make the user on a voice call as the target user to obtain the audio mixing feature, and the voice during the current communication can be recognized in real time based on the audio mixing feature, so as to separate the target audio and the audio in the environmental noise, and to achieve noise reduction during the communication.

Here, the audio mixing feature includes the voiceprint feature and the pitch feature of the target object. The pitch feature is the lowest audio frequency that the target user can speak, and the audio made by the target user can be a multiple of the pitch audio frequency. For different people, pitches are generally different, that is, the lowest audios are different. The voiceprint feature includes tone, timbre, intensity, the wavelength of sound wave, frequency, and rhythm of change, and the like, which can reflect the speaking characteristics of different people. Because different people have different vocal organs, such as oral cavity and vocal cords, and different people have different speaking habits, each person has different voiceprint features.

In the embodiments of the present disclosure, the audio mixing feature of the target object is obtained, and the voiceprint feature and the pitch feature of the target object are obtained by the voiceprint extraction and the pitch extraction through a neural network. The audio mixing feature of the target object is obtained according to the voiceprint feature and the pitch feature. Performing the voice recognition through the audio mixing feature not only takes the use of various voiceprint features, but can also take the use of the characteristic of different pitches of different people. Therefore, for users with similar speaking habits or similar tones in the same gender, higher recognition performance can be achieved.

Here, the mixed audio may include the target audio generated by the speaking of the target object and audio generated by the speaking of other people, or include the target audio and other environmental noises. According to the audio mixing feature, the target audio matching with the target object in the mixed audio is determined by a classification neural network. By the method of comparing the audio mixing features, the target audio and the mixed audio can be classified or the target audio can be separated from the mixed audio.

In addition, the mixed audio may not include the target audio, and whether the mixed audio includes the target audio can be identified by the method of audio separation. Therefore, the above method can also be used to determine whether the mixed audio includes the target audio. When the target audio matching with the target object is determined by the audio mixing feature, it can be determined that the verification of the target audio is successful. When there is no target audio in the mixed audio, the verification fails.

In this way, by including the voiceprint feature and the pitch feature, the recognition effect of the audio recognition is effectively improved, especially for users of the same gender, the recognition rate is improved, and the using effect is improved.

In some embodiments, determining the audio mixing feature of the target object includes: obtaining an audio signal of the target object; extracting the voiceprint feature of the target object according to a frequency spectrum of the audio signal; obtaining the pitch feature of the target object according to the voiceprint feature; and determining the audio mixing feature according to the voiceprint feature and the pitch feature.

Here, the audio mixing feature can be obtained during voice separation, or can be obtained and stored in advance. The stored audio mixing feature can be used for the separation during voice separation. The process of obtaining the audio mixing feature is realized by collecting the audio signal of the target object, and using the frequency spectrum of the audio signal for feature extraction.

The voiceprint feature can be extracted based on the frequency spectrum of the audio signal, and then the pitch feature of the target object can be further obtained based on the voiceprint feature. For example, the audio signal frequency spectrum of the target object is inputted to the neural network for voiceprint extraction so as to output the voiceprint feature. Then the voiceprint feature is input to the neural network of pitch extraction to obtain the pitch feature.

In this way, by performing feature extraction on the audio signal of the target object, the audio mixing feature including the voiceprint feature and the pitch feature can be obtained, so as to facilitate subsequent voice separation as a parameter used for separation.

In some embodiments, obtaining the pitch feature of the target object according to the voiceprint feature includes: inputting the voiceprint feature into a predetermined pitch extraction network model to obtain the pitch feature.

In embodiments of the present disclosure, a neural network model can be used to process audio signals to obtain the voiceprint feature, or a neural network model can be used to obtain the pitch feature, that is, the above pitch extraction network model.

Exemplarily, the voiceprint feature is inputted into the predetermined pitch extraction network model to obtain the pitch feature. The pitch extraction network model can include a multi-layer LSTM (Long Short-Term Memory Network), a fully connected layer and the like. After the pitch feature is obtained by using the pitch extraction network, the pitch feature and the voiceprint feature can be used together as the audio mixing feature for subsequent voice separation.

In another embodiment, other neural networks can also be used to directly obtain the pitch feature and the voiceprint feature from the frequency spectrum of the audio signal to obtain the audio mixing feature needed by voice separation.

In some embodiments, extracting the voiceprint feature of the target object according to a frequency spectrum of the audio signal includes: inputting the frequency spectrum of the audio signal into the predetermined voiceprint extraction network model to obtain the voiceprint feature of the target object.

Here, the frequency spectrum of the voice can be obtained by performing short-time Fourier transform on the audio signal, and then the frequency spectrum is input to the voiceprint extraction network model for voiceprint feature extraction.

Exemplarily, the voiceprint extraction network model can be composed of a RESNET (Residual Network), a pooling layer, a fully connected layer, and the like. The pooling layer may include multiple layers, for example, two layers. A loss function used in model training can be a cross entropy.

The voiceprint feature of the target object obtained through the voiceprint extraction network model can be used as an input parameter for pitch extraction on the one hand, and on the other hand, it can be used as a separation parameter in the voice separation process together with the pitch feature.

In some embodiments, performing voice separation on a mixed audio according to the audio mixing feature to obtain a target audio matching with the target object in the mixed audio includes: obtaining audio features of the mixed audio on respective audio frames; inputting the audio features on the respective audio frames and the audio mixing feature into respective sub-modules of a separation network model to obtain output results of the respective sub-modules; and obtaining the target audio matching with the target object in the mixed audio according to an overall output result of the output results of the respective sub-modules in series.

Here, the object for voice separation may be a mixed audio, and the content of the mixed audio is unknown to the separation network model. Therefore, the mixed audio may include the voice audio of the target object, the voice audio of other people, and various other noises, and the like.

The process of performing voice separation may include recognizing the voice audio of the target object in the mixed audio, and may also include recognizing other audio except for the target object. Therefore, on the one hand, the above voice separation can be used to obtain target audio matching with the target object; on the other hand, it can also be used to confirm whether there is a target audio matching with the target object in the mixed audio.

In the embodiments of the present disclosure, the mixed audio may be preprocessed first when performing voice separation, including framing the mixed audio, and may also including performing windowing processing.

For mixed audio, the audio features on the respective audio frames can be obtained, and the audio feature can be used as the input of the separation network model. The separation network model separates the input audio feature according to the audio mixing feature so as to obtain the separated output results.

The separated network model may include a plurality of sub-modules, and these sub-modules are used to process the audio features of the respective audio frames. Therefore, the overall output result of the output results of the respective sub-modules in series is the separation result of the whole mixed audio.

Exemplarily, each sub-module of the separated network model may be composed of a multi-layer LSTM and a fully connected layer.

Figure 2:
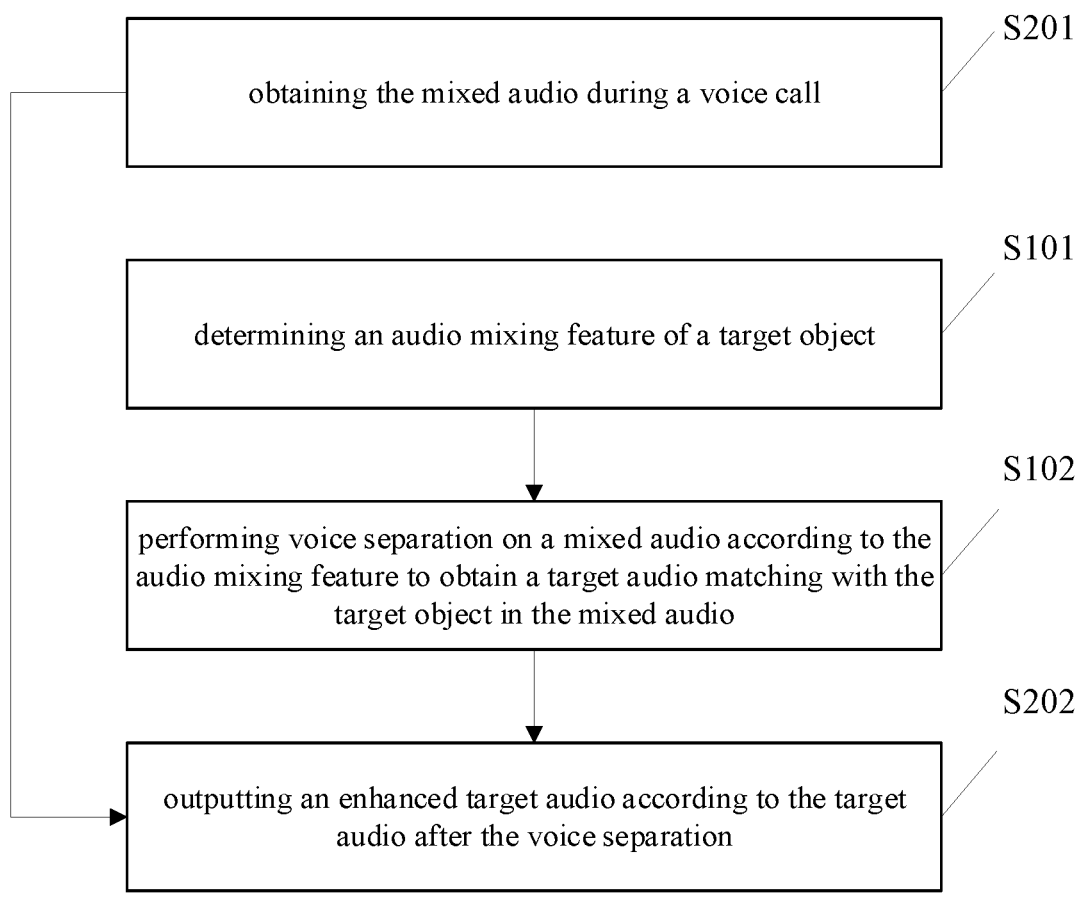
FIG. 2 is a flow chart 2 illustrating a method for audio processing according to an exemplary embodiment.

In some embodiments, as illustrated in FIG. 2, the method further includes: In block S201, the mixed audio is obtained during a voice call; and in block S202, an enhanced target audio is output according to the target audio after the voice separation.

In the embodiments of the present disclosure, the above voice separation may be performed during a voice call. During a voice call, the calling party (people on the calling line) can be the target object, and the voice of the calling party, the voice of other people in the surrounding environment and environmental noise are input at the same time so as to form a mixed audio.

When the mixed audio is directly transmitted as input to the opposite end of the voice call, the output of the opposite end is also an audio including noise, which affects the reception of the effective information by the user at the opposite end and reduces the quality of the voice call. Therefore, in the embodiments of the present disclosure, voice separation can be performed during a voice call, and the target audio is separated from the mixed audio and transmitted to the opposite end. In this way, the noise part of the audio signal received by the opposite end has been largely eliminated so as to improve the quality of the voice call.

That is to say, through the voice separation in the embodiments of the present disclosure, the noise reduction processing during a voice call is realized, so that the enhanced target audio is output and transmitted to the opposite end.

In the embodiments of the present disclosure, after the target audio in the mixed audio is separated, further post-processing such as noise reduction and amplification can be performed by the method of Wiener filtering, and the like, so as to output the enhanced target audio.

Since in the embodiments of the present disclosure, the mixed audio is separated using the audio mixing feature including the voiceprint feature and the pitch feature. The audio mixing feature is used to reduce the noise of the input mixed audio, which can effectively improve the noise reduction effect, especially during a voice call. When other people are speaking in the environment where the target object is located, a good noise reduction effect can also be achieved.

In some embodiments, the method further includes: obtaining registration information carrying a voice of the target object; and obtaining the audio mixing feature according to the registration information.

The audio mixing feature can be obtained in advance before the voice separation, and the audio mixing feature to be used can be obtained by prompting the user to register and inputting a voice template.

Here, the target object can input voice information according to the prompts when registering, for example, during the registration process, the user is prompted to read a specified text, and the input voice content of the target user is collected. The voice input by the user is carried in the registration information, and the terminal can process the voice therein according to the registration information, including the extraction of the voiceprint feature and the extraction of the pitch feature, and the like, to finally obtain the audio mixing feature.

In this way, after the registration of the target object, the terminal can realize the identification of the user, which improves the security of voice information, and facilitates the subsequent use of the voice separation function for the target object in various voice input scenarios.

In some embodiments, the mixed audio at least includes a voice audio of two different objects; in which the voice audio of the two different objects includes the voice audio of different objects with the same gender.

In the embodiments of the present disclosure, the feature used for voice separation is the audio mixing feature including the voiceprint feature and the pitch feature of the target object, so the voice content of different objects of the same gender has a better recognition effect.

When the method for audio processing in the embodiments of the present disclosure is applied to process the mixed audio, it can be applied to various mixed audios. That is to say, when the mixed audio both includes the voice audio of the target object and the voice audio of other objects of the same gender as the target object, the above method for audio processing can also be used to realize the audio separation of the target object.

In this way, the method provided by the embodiments of the present disclosure has a wider range of application scenarios and a better separation effect.

The embodiments of the present disclosure also provide the following examples.

The goal of voice separation is to separate voice signals of each target speaker from a plurality of mixed speakers. In some embodiments, the method of voice separation is the method centering on the blind source separation technology based on independent component analysis. The voice separation technology based on deep learning has gradually become the mainstream trend in voice separation. In the training process, a voice feature is used as network input for training, so that the model has the ability to distinguish different speakers. In an embodiment, the high-dimensional spectral voice feature can be used as network input for training, but the separation performance may be poor when voices overlap and speakers of the same gender are separated.

In the embodiments of the present disclosure, the application scenario may be a mobile phone voice communication scenario, which implements the voice enhancement and the noise reduction functions for a specific speaker. For example, speaker A registers before use, and A's voice can be passed through and transmitted to the other party when the voice call is made after the registration is completed. When the voices of other speakers such as user B and user C appear at this time, they will not be transmitted. When user A and user B speak at the same time, only the voice of user A will pass through and be transmitted to the other party.

The embodiments of the present disclosure adopt a combination of deep learning and pitch extraction, use the learning characteristics of the deep neural network, combine the pitch feature that is more distinguishable for speakers of the same gender, and use the mixed feature training model, so that the separation task of the target speaker can avoid a significant drop in performance in the scenario having speakers of the same gender. The specific method may include the following blocks.

Figure 3:
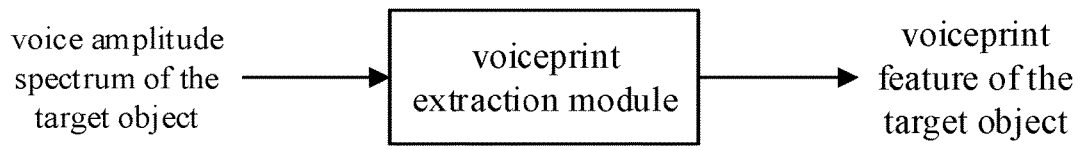
FIG. 3 is a schematic diagram illustrating a voiceprint feature extraction in a method for audio processing according to an exemplary embodiment.

At the registration stage, as illustrated in FIG. 3, the voiceprint extraction module is used to extract the voiceprint of the voice signal of the target object so as to obtain the voiceprint feature of the target object. The voiceprint extraction module is trained by deep learning technology. The input of this module is the STFT (Short-Time Fourier Transform) amplitude spectrum of the target object's registered corpus, and the output is a 128-dimensional voiceprint feature.

Figure 4:
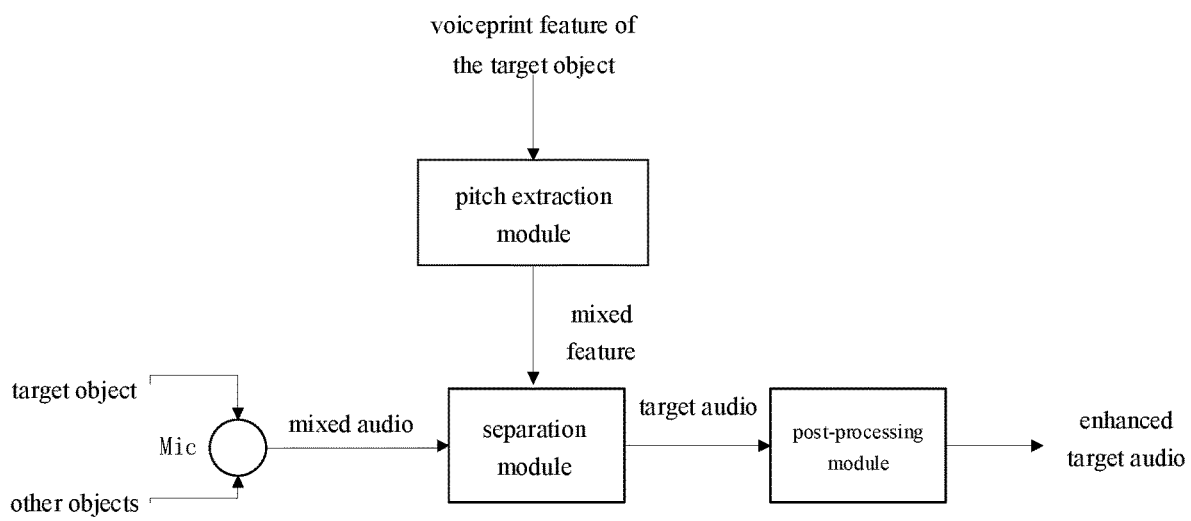
FIG. 4 is a schematic diagram illustrating a voice separation in a method for audio processing according to an exemplary embodiment.

At the separation stage, as illustrated in FIG. 4, the pitch extraction module of the target object is used to extract the pitch of the voiceprint feature of the target object, and the voiceprint feature is mixed to obtain the audio mixing feature. The pitch extraction module can be obtained through deep learning training.

The audio mixing feature is inputted to the separation module as a parameter to separate the target object in the mixed audio including the target object and other object voice signals. Here, the mixed audio can be collected by an audio collection device, such as a microphone (Mic), and input to the separation module. After the separation, the target audio of the target object can pass through the post-processing module again to perform Wiener filtering, thereby outputting the enhanced target audio.

In the embodiments of the present disclosure, the input feature of the voiceprint extraction module is the STFT amplitude spectrum of a piece of corpus of the target object. The network structure can be a RESNET, connecting two pooling layers, and finally connecting a fully connected layer. The training loss function is a cross entropy.

The input feature of the pitch extraction module can be a 128-dimensional voiceprint feature of the target object, the network structure can be a multi-layer LSTM (Long Short-Term Memory) connecting one layer of output fully connected layer, and the training loss function can be a cross entropy.

The input feature of the separation module can be the voiceprint mixed feature including the pitch feature and the voiceprint feature of the corpus of one end of the target object. The network structure can be a multi-layer LSTM neural network in series connection with a neural network of a fully connected layer as a sub-module, and the input features and the audio mixing features of the respective sub-modules are used as the input. The complete network of the separation module includes a plurality of identical sub-modules in series connection. The output result is a multi-frame voice signal of the target object after separation. The loss function trained by the separation module can also be a cross entropy.

Through the technical solution of the embodiments of the present disclosure, based on the deep learning network, the pitch feature and the voiceprint feature are combined to separate the mixed audio, which improves the performance of the separation model, at the same time, effectively improves the separation of the mixed audio of the speakers of the same gender, so that the voice quality after separation is higher.

Figure 5:
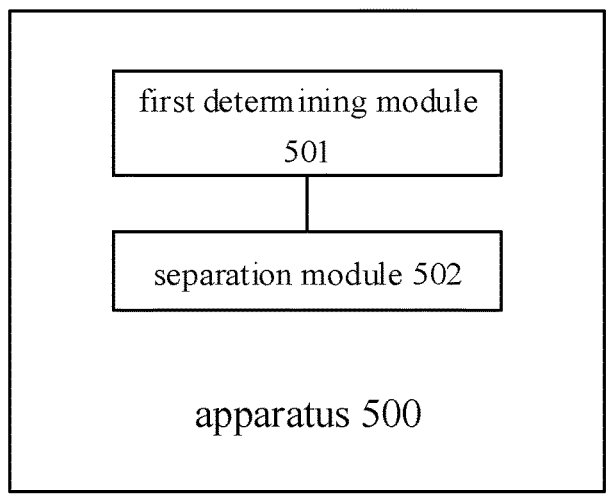
FIG. 5 is a structure diagram illustrating an apparatus for audio processing according to an exemplary embodiment.

FIG. 5 is a structure diagram illustrating an apparatus for audio processing according to an exemplary embodiment. As illustrated in FIG. 5, the apparatus 500 includes: a first determining module 501 and a separation module 502.

The first determining module 501 is configured to determine an audio mixing feature of a target object, in which the audio mixing feature at least includes: a voiceprint feature and a pitch feature of the target object; and the separation module 502 is configured to perform voice separation on a mixed audio according to the audio mixing feature to obtain a target audio matching with the target object in the mixed audio.

In some embodiments, the first determining module includes: a first obtaining sub-module, an extraction sub-module, a second obtaining sub-module, and a first determining sub-module. The first obtaining sub-module is configured to obtain an audio signal of the target object; the extraction sub-module is configured to extract a voiceprint feature of the target object according to a frequency spectrum of the audio signal; the second obtaining sub-module is configured to obtain a pitch feature of the target object according to the voiceprint feature; and the first determining sub-module is configured to determine the audio mixing feature according to the voiceprint feature and the pitch feature.

In some embodiments, the second obtaining sub-module is specifically configured to: input the voiceprint feature into a predetermined pitch extraction network model to obtain the pitch feature.

In some embodiments, the extraction sub-module is specifically configured to: input the frequency spectrum of the audio signal into the predetermined voiceprint extraction network model to obtain the voiceprint feature of the target object.

In some embodiments, the separation module includes: a third obtaining sub-module, an input sub-module, and an output sub-module. The third obtaining sub-module is configured to obtain audio features of the mixed audio on respective audio frames; the input sub-module is configured to input the audio features on respective audio frames and the audio mixing feature into respective sub-modules of a separation network model to obtain output results of respective sub-modules; and the output sub-module is configured to obtain the target audio matching with the target object in the mixed audio according to an overall output result of the output results of the respective sub-modules in series.

In some embodiments, the apparatus further includes: a first obtaining module and an output sub-module. The first obtaining module is configured to obtain the mixed audio during a voice call; and the output module is configured to output an enhanced target audio according to the target audio after the voice separation.

In some embodiments, the apparatus further includes: a second obtaining module and a third obtaining module. The second obtaining module is configured to obtain registration information carrying a voice of the target object; and the third obtaining module is configured to obtain the audio mixing feature according to the registration information.

In some embodiments, the mixed audio at least comprises voice audios of two different objects, and the voice audios of the two different objects comprise voice audios of different objects with a same gender.

Regarding to the apparatus in the above embodiments, the specific operation methods in which the respective modules perform has been described in detail in the embodiments of the method, and will not be elaborated here.

Figure 6:
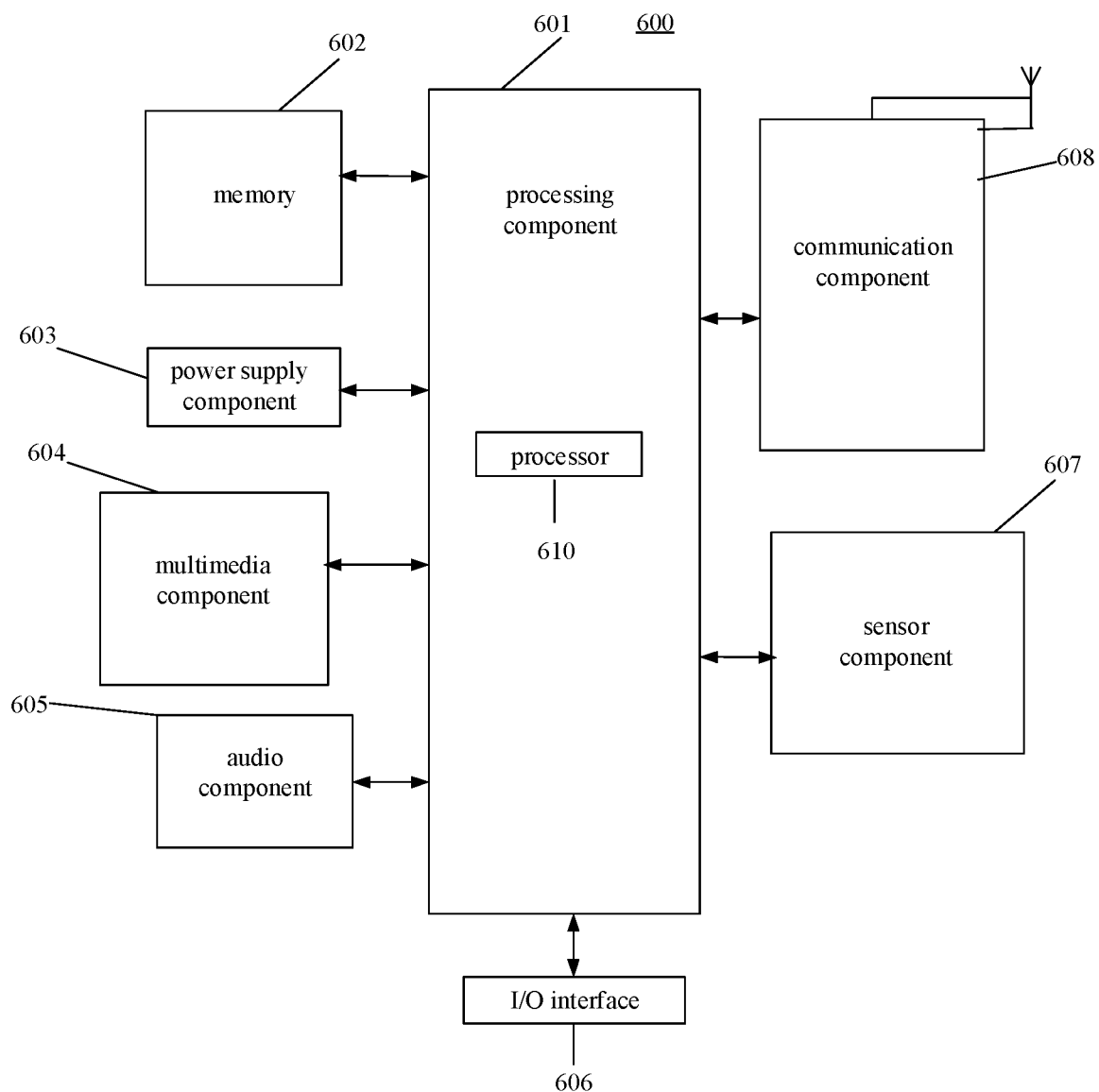
FIG. 6 is an entity structure diagram illustrating a terminal according to an exemplary embodiment.

FIG. 6 is a block diagram illustrating an apparatus 600 according to an exemplary embodiment. For example, the terminal 600 can be a mobile phone, a computer, a digital broadcasting terminal, a messaging device, a game console, a tablet device, a medical device, a fitness device, a personal digital assistant, and the like.

According to FIG. 6, the terminal 600 may include one or more of the following components: a processing component 601, a memory 602, a power supply component 603, a multimedia component 604, an audio component 605, an input/output (I/O) interface 606, a sensor component 607, and a communication component 608.

The processing component 601 typically controls overall operations of the control terminal 600, such as the operations associated with display, telephone calls, data communications, camera operations, and recording operations. The processing component 601 may include one or more processors 610 to execute instructions to perform all or part of the blocks in the above described method. In addition, the processing component 601 may also include one or more modules to facilitate the interaction between the processing component 601 and other components. For example, the processing component 601 may include a multimedia module to facilitate the interaction between the multimedia component 604 and the processing component 601.

The memory 610 is configured to store various types of data to support various operations on the terminal 600. Examples of these data include instructions for any application or method operating on the terminal 600, such as contact data, phone book data, messages, pictures, videos, and the like. The memory 602 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 603 provides power for various components of the terminal 600. The power component 603 may include a power management system, one or more power supplies, and other components associated with the generation, management, and distribution of power for the terminal 600.

The multimedia component 604 includes a screen that provides an output interface between the terminal 600 and the user. In some embodiments, the screen may include a liquid crystal display (LCD) and a touch panel (TP). If the screen includes a touch panel, the screen may be used as a touch screen to receive input signals from the user. The touch panel includes one or more touch sensors to sense touch, slide, and gestures on the touch panel. The touch sensors may not only sense a boundary of a touch or swipe action, but also sense a period of time and a pressure associated with the touch or swipe action. In some embodiments, the multimedia component 604 includes a front camera and/or a rear camera. When the terminal 600 is in an operation mode, such as a shooting mode or a video mode, the front camera and/or the rear camera may receive external multimedia data. Each of the front camera and/or the rear camera may be a fixed optical lens system or have focus and optical zoom capability.

The audio component 605 is configured to output and/or input audio signals. For example, the audio component 605 includes a microphone (MIC). When the terminal 600 is in an operation mode, such as a call mode, a recording mode, and a voice recognition mode, the microphone is configured to receive external audio signals. The received audio signal may be further stored in the memory 610 or transmitted via the communication component 608. In some embodiments, the audio component 605 further includes a speaker to output audio signals.

The I/O interface 606 provides an interface between the processing component 601 and the peripheral interface modules, such as a keyboard, a click wheel, buttons, and the like. These buttons may include but are not limited to: home button, volume button, start button, and lock button.

The sensor component 607 includes one or more sensors to provide status assessments of various aspects of the terminal 600. For example, the sensor component 607 may detect the on/off state of the terminal 600 and relative position of components, for example, components as the display and the keypad of the terminal 600. The sensor component 607 may also detect changes of the position of the terminal 600 or one component of the terminal 600, and the presence or absence of contact between a user and the terminal 600, the position or acceleration/deceleration of the terminal 600, and the temperature change of the terminal 600. The sensor component 607 may include a proximity sensor configured to detect the presence of nearby objects without any physical contact. The sensor component 607 may also include a light sensor, such as a CMOS or CCD image sensor for the imaging applications. In some embodiments, the sensor component 607 may also include an accelerometer sensor, a gyroscope sensor, a magnetic sensor, a pressure sensor, or a temperature sensor.

The communication component 608 is configured to facilitate wired or wireless communication between the terminal 600 and other devices. The terminal 600 may get access to a wireless network based on the communication standard, such as WiFi, 2G or 3G; or their combinations. In one exemplary embodiment, the communication component 608 receives a broadcast signal or broadcast associated information from an external broadcast management system via a broadcast channel. In one exemplary embodiment, the communication component 608 further includes a near field communication (NFC) module to facilitate short-range communications. For example, the NFC module can be implemented based on Radio Frequency Identification (RFID) technology, Infrared Data Association (IrDA) technology, Ultra-Wide Band (UWB) technology, Blue Tooth (BT) technology or other technologies.

In an exemplary embodiment, the terminal 600 may be implemented by one or more application specific integrated circuits (ASIC), digital signal processors (DSP), digital signal processing devices (DSPD), programmable logic devices (PLD), field-programmable gate array (FPGA), controller, micro-controller, microprocessor, or other electronic components, for performing the above method.

In exemplary embodiments, there is also provided a non-transitory computer-readable storage medium including instructions, such as included in the memory 602, executable by the processor 610 in the terminal 600, for performing the above method. For example, the non-transitory computer-readable storage medium may be a ROM, a RAM, a CD-ROM, a magnetic tape, a floppy disc, an optical data storage device, and the like.

In the embodiments of the present disclosure, there is also provided a non-transitory computer-readable storage medium. When the instructions in the storage medium are executed by a processor of a mobile terminal, the mobile terminal can implement the method provided by any one of the above embodiments.

Other embodiments of the present disclosure will be apparent to those skilled in the art from consideration of the specification and practice of the invention disclosed here. The present disclosure is intended to cover any variations, uses, or adaptive changes of the invention. These variations, uses, or adaptive changes follow the general principles of the invention and include common knowledge or conventional technical means in the technical field which are not disclosed in the present disclosure. It is intended that the specification and examples be considered as exemplary only, with a true scope and spirit of the invention being indicated by the following claims.

It should be understood that the invention is not limited to the precise structure described above and shown in the drawings, and various modifications and changes can be made without departing from its scope. The scope of the present disclosure is only limited by the appended claims.

What is claimed is:

1. A method for voice recognition in a mixed audio, comprising:
    obtaining an audio signal of a target object;
    extracting a voiceprint feature of the target object according to a short-time Fourier transform amplitude spectrum of the audio signal;
    inputting the voiceprint feature into a predetermined pitch extraction network model to obtain a pitch feature, wherein the pitch feature refers to a lowest audio frequency that the target object can speak;
    determining an audio mixing feature of the target object at least comprising the voiceprint feature and the pitch feature, wherein the audio mixing feature is used as a separation parameter in a voice separation process;
    obtaining each audio feature of the mixed audio on each audio frame;
    inputting each audio feature on each audio frame and the audio mixing feature into each sub-module of a separation network model to obtain an output result of each sub-module; and
    obtaining a target audio matching with the target object in the mixed audio according to an overall output result of connecting the output results of all the sub-modules in series;
    wherein the method further comprises: obtaining the mixed audio during a voice call, wherein the mixed audio comprises the target audio and noises, and outputting an enhanced target audio by performing noise reduction and amplification on the target audio after the voice separation process.

2. The method of claim 1, wherein extracting the voiceprint feature of the target object comprises:
    inputting the Short-Time Fourier Transform amplitude spectrum of the audio signal into a predetermined voiceprint extraction network model to obtain the voiceprint feature of the target object.

3. The method of claim 1, further comprising:
    obtaining registration information carrying a voice of the target object; and
    obtaining the audio mixing feature according to the registration information.

4. The method of claim 1, wherein the mixed audio at least comprises voice audios of two different objects, and the voice audios of the two different objects comprise voice audios of different objects with a same gender.

5. An apparatus for voice recognition in a mixed audio, comprising:
    one or more processors;
    a memory storing instructions executable by the one or more processors;
    wherein the one or more processors are configured to:
    obtain an audio signal of a target object;
    extract a voiceprint feature of the target object according to a short-time Fourier transform amplitude spectrum of the audio signal;
    input the voiceprint feature into a predetermined pitch extraction network model to obtain a pitch feature, wherein the pitch feature refers to a lowest audio frequency that the target object can speak;
    determine an audio mixing feature of the target object at least comprising the voiceprint feature and the pitch feature, wherein the audio mixing feature is used as a separation parameter in a voice separation process;
    obtain each audio feature of the mixed audio on each audio frame;
    input each audio feature on each audio frame and the audio mixing feature into each sub-module of a separation network model to obtain an output result of each sub-module; and
    obtain a target audio matching with the target object in the mixed audio according to an overall output result of connecting the output results of all the sub-modules in series;

wherein the one or more processors are configured to:
obtain the mixed audio during a voice call, wherein the mixed audio comprises the target audio and noises, and
output an enhanced target audio by performing noise reduction and amplification on the target audio after the voice separation process.

6. The apparatus of claim 5, wherein the one or more processors are configured to:
input the short-time Fourier transform amplitude spectrum of the audio signal into a predetermined voiceprint extraction network model to obtain the voiceprint feature of the target object.

7. The apparatus of claim 5, wherein the one or more processors are configured to:
obtain registration information carrying a voice of the target object; and
obtain the audio mixing feature according to the registration information.

8. The apparatus of claim 5, wherein the mixed audio at least comprises voice audios of two different objects, and the voice audios of the two different objects comprise voice audios of different objects with a same gender.

9. A non-transitory computer-readable storage medium having computer-executable instructions stored thereon, wherein when the computer-executable instructions are executed by a processor, the processor is caused to implement a method for voice recognition in a mixed audio, and the method comprises:

obtaining an audio signal of a target object;
extracting a voiceprint feature of the target object according to a short-time Fourier transform amplitude spectrum of the audio signal;
inputting the voiceprint feature into a predetermined pitch extraction network model to obtain a pitch feature, wherein the pitch feature refers to a lowest audio frequency that the target object can speak;
determining an audio mixing feature of the target object at least comprising the voiceprint feature and the pitch feature, wherein the audio mixing feature is used as a separation parameter in a voice separation process;
obtaining each audio feature of the mixed audio on each audio frame;
inputting each audio feature on each audio frame and the audio mixing feature into each sub-module of a separation network model to obtain an output result of each sub-module; and
obtaining a target audio matching with the target object in the mixed audio according to an overall output result of connecting the output results of all the sub-modules in series;
wherein the method further comprises: obtaining the mixed audio during a voice call wherein the mixed audio comprises the target audio and noises, and outputting an enhanced target audio by performing noise reduction and amplification on the target audio after the voice separation process.

* * * * *